United States Patent Office.

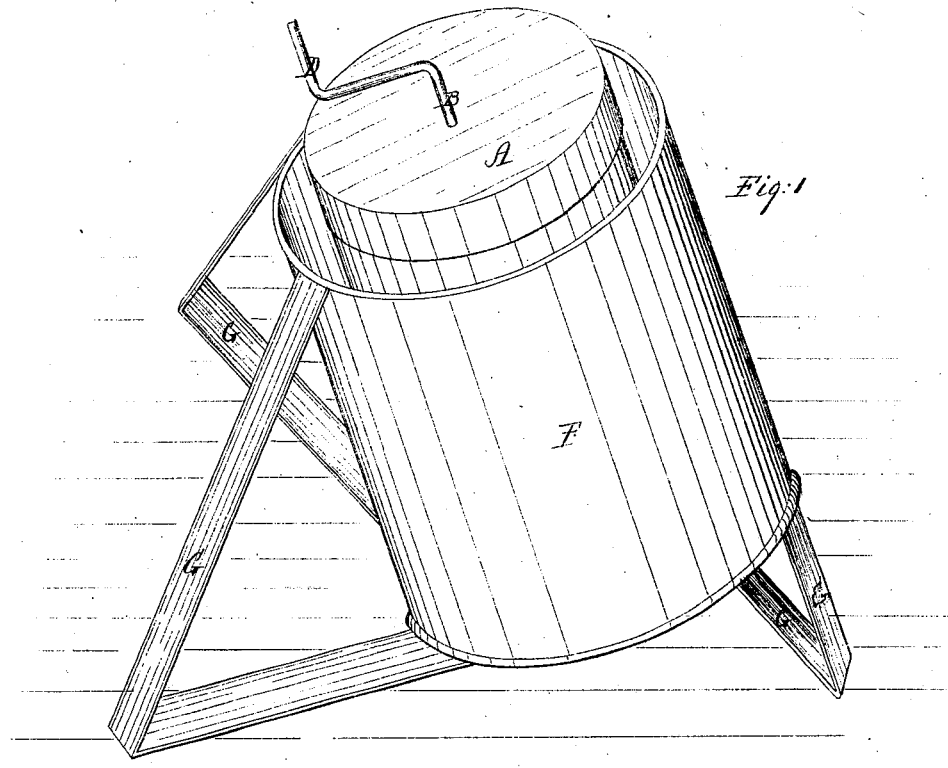
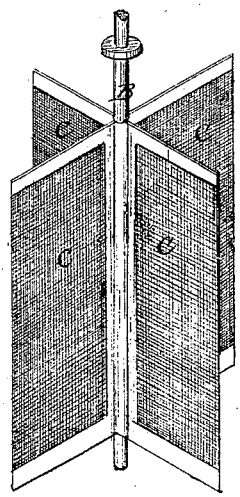
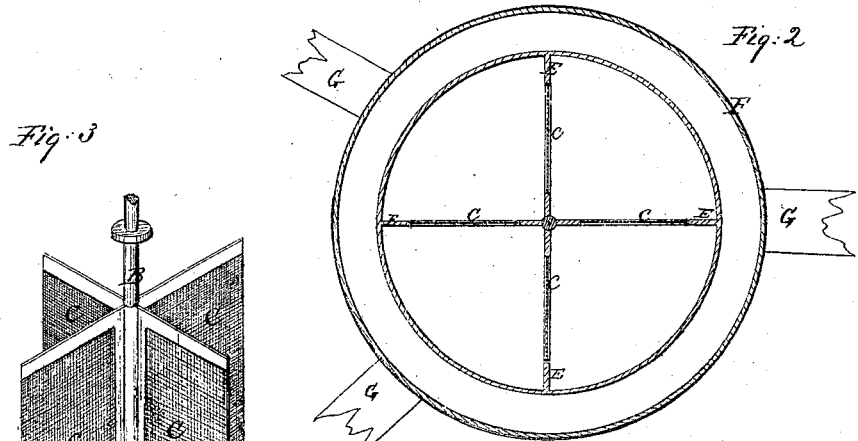

FRANCIS BURDICK, OF SOUTH EAST, NEW YORK, AND LODOWICK BURDICK, OF LOCKHAVEN, PENNSYLVANIA.

*Letters Patent No. 95,560, dated October 5, 1869.*

IMPROVEMENT IN CHURNS.

The Schedule referred to in these Letters Patent and making part of the same.

We, FRANCIS BURDICK, of the town of South East, in the county of Putnam, and State of New York, and LODOWICK BURDICK, of Lockhaven, in the county of Clinton, and State of Pennsylvania, have invented certain Improvements in Taking Butter from Sweet Milk, of which the following is a full, clear, and exact description, reference being had to the accompanying drawings, forming part of this specification, and to the letters of reference marked thereon, in which—

Figure 1 is a side elevation thereof;

Figure 2, a cross central section of the same; and

Figure 3, a perspective view of the shaft, with its paddles or wings.

The nature of our invention consists in the arrangement of the devices herein described, for taking butter from sweet milk.

To enable others skilled in the art to make and use our invention, we will proceed to describe its construction and operation. This invention consists of a cylinder placed in a diagonal position.

A, on the drawing, is a cylinder, to be made of either large or small capacity, for operating the milk of large or small dairies.

Parallel with, and in the centre of the cylinder, is placed a shaft, B.

On this shaft are fitted and securely fastened four paddles or wings, marked C, at right angles with the shaft, each paddle or wing to be perforated with many holes, or made open, and covered with wire-cloth.

On the top of the shaft is a crank, D, if operated by hand; or a pulley or cog-wheels will be attached to the top of the shaft, if propelled by other power.

On the inside of the cylinder, longitudinally, are securely fastened ribs E, about six inches apart, and about one and a half inch wide, running lengthwise inside of cylinder, and projecting toward the centre.

The length of paddles or wings is made, when the shaft revolves, to run close to the ribs, and when in motion, the centrifugal force drives the milk from the centre of the cylinder to the extremity of the wings or paddles, and the ribs check the motion of the sweet milk, and form an eddy or whirlpool to each rib, thereby separating the butter from the extraneous matter of the milk, during the operation of separating the whole of the butter, or any part therefrom.

The butter will then be taken from the cylinder and worked the usual way, and salted.

In preparing the milk after being drawn from the cow, before fermentation takes place, it must be cooled, to take from it the animal heat, after which it must again be increased in temperature to 75° or 80° Fahrenheit's thermometer, in summer, and from 80° to 85° in winter.

It is intended to make the aforesaid cylinder of tin or sheet-iron galvanized, or of other metal.

The cylinder, when ready for operation, is enclosed by placing it in an outside casing or tub, F, made water-tight, for the purpose of cooling the butter at the proper time; that is to say, if only half of the butter which the milk will produce is wanted, and the milk, being perfectly sweet, intended for the manufacture of cheese, or for condensing, then cold water is to be introduced into the outside tub or casing F, which holds the cylinder, to reduce the temperature of the milk and butter to about 65°; and if all the butter is required from the milk to be operated on, the operation of the machine will be continued until all the butter is produced, and the cold water is to be introduced into the outside casing or tub F gradually, before the operation is completed.

In no case must the cold water for cooling be used until the operation of getting the butter is nearly completed.

If the temperature of the milk to be operated on be too low, then hot water must be added to the outside tub or casing F, which holds the cylinder of milk, to regulate the temperature to the desired point required.

The operation of the machine, at the temperatures of the milk, as above described, is intended to take half, or more or less, or all the butter from sweet milk, leaving the milk perfectly sweet for the manufacturing of cheese, and for condensing, and for feeding young stock.

Claim.

What we claim as new, and desire to secure by Letters Patent of the United States, is—

The combination and arrangement of the cylinder F, beaters E, wire-gauze dashers or wings C, and standards G, constructed and operated in the manner and for the purposes above set forth.

FRANCIS BURDICK.
LODOWICK BURDICK.

Witnesses:
MATTHIAS CRANE,
W. P. CRANE.